US009881089B2

(12) United States Patent
Lee et al.

(10) Patent No.: US 9,881,089 B2
(45) Date of Patent: Jan. 30, 2018

(54) POP-UP SEARCH BOX

(71) Applicant: Verizon New Jersey Inc., Arlington, VA (US)

(72) Inventors: Woo Beum Lee, Basking Ridge, NJ (US); Jeffrey Walsh, Verona, NJ (US)

(73) Assignee: Verizon New Jersey Inc., Basking Ridge, NJ (US)

( * ) Notice: Subject to any disclaimer, the term of this patent is extended or adjusted under 35 U.S.C. 154(b) by 169 days.

(21) Appl. No.: 14/263,619

(22) Filed: Apr. 28, 2014

(65) Prior Publication Data
US 2015/0309682 A1 Oct. 29, 2015

(51) Int. Cl.
*G06F 3/048* (2013.01)
*G06F 17/30* (2006.01)

(52) U.S. Cl.
CPC ........ *G06F 17/30864* (2013.01); *G06F 3/048* (2013.01); *G06F 17/30696* (2013.01)

(58) Field of Classification Search
CPC ...................................................... G06F 3/048
See application file for complete search history.

(56) References Cited

U.S. PATENT DOCUMENTS

| 8,943,036 | B1 * | 1/2015 | Coudron | G06F 17/30864 |
| | | | | 707/706 |
| 2008/0168349 | A1 * | 7/2008 | Lamiraux | G06F 3/0482 |
| | | | | 715/702 |
| 2009/0234811 | A1 * | 9/2009 | Jamil | G06F 17/30867 |
| 2011/0126096 | A1 * | 5/2011 | Ohashi | G06F 3/04883 |
| | | | | 715/702 |
| 2012/0284247 | A1 * | 11/2012 | Jiang | G06F 17/30867 |
| | | | | 707/706 |
| 2012/0324362 | A1 * | 12/2012 | Jung | H04L 12/12 |
| | | | | 715/738 |
| 2013/0241952 | A1 * | 9/2013 | Richman | G06F 17/21 |
| | | | | 345/619 |
| 2014/0143737 | A1 * | 5/2014 | Mistry | G06F 3/0488 |
| | | | | 715/854 |
| 2014/0201181 | A1 * | 7/2014 | Agarwal | G06F 17/2247 |
| | | | | 707/706 |
| 2014/0331156 | A1 * | 11/2014 | Kulikov | G06F 17/30867 |
| | | | | 715/765 |
| 2015/0058318 | A1 * | 2/2015 | Blackwell | G06F 17/30554 |
| | | | | 707/722 |

OTHER PUBLICATIONS

"How to search in Chrome—Chrome Help," (available at https://support.google.com/chrome/answer/95655?hl=en, visited Apr. 28, 2014).

* cited by examiner

Primary Examiner — Xuyang Xia

(57) ABSTRACT

A user device may: receive a search selection; and display a search box concurrently with application or page from which the search selection was received. The search box may be displayed without the user device navigating to another application or another page. The user device may output a search query based on search terms inputted into the search box; receive search results to the search query; and display or outputting the search results.

20 Claims, 7 Drawing Sheets

POP-UP SEARCH BOX

BACKGROUND

As a user of a user device reads text (e.g., relating to an article, a book, etc.) within an application running on the user device (e.g., a web browsing application, a messaging application, an e-reader application, etc.), the user may wish to search for terms in the text (e.g., to further the user's knowledge about a particular subject).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique for a user device to display a search box (e.g., a pop-up search box), based on receiving a selection of text from within an application. The search box may be displayed within the application without causing the user device to navigate away from a page or application from which the text was selected. In some implementations, the search box may be pre-populated with the selected text. Also, additional terms may be added to the search box (e.g., via voice input, keyboard input, etc.).

Figure 1:
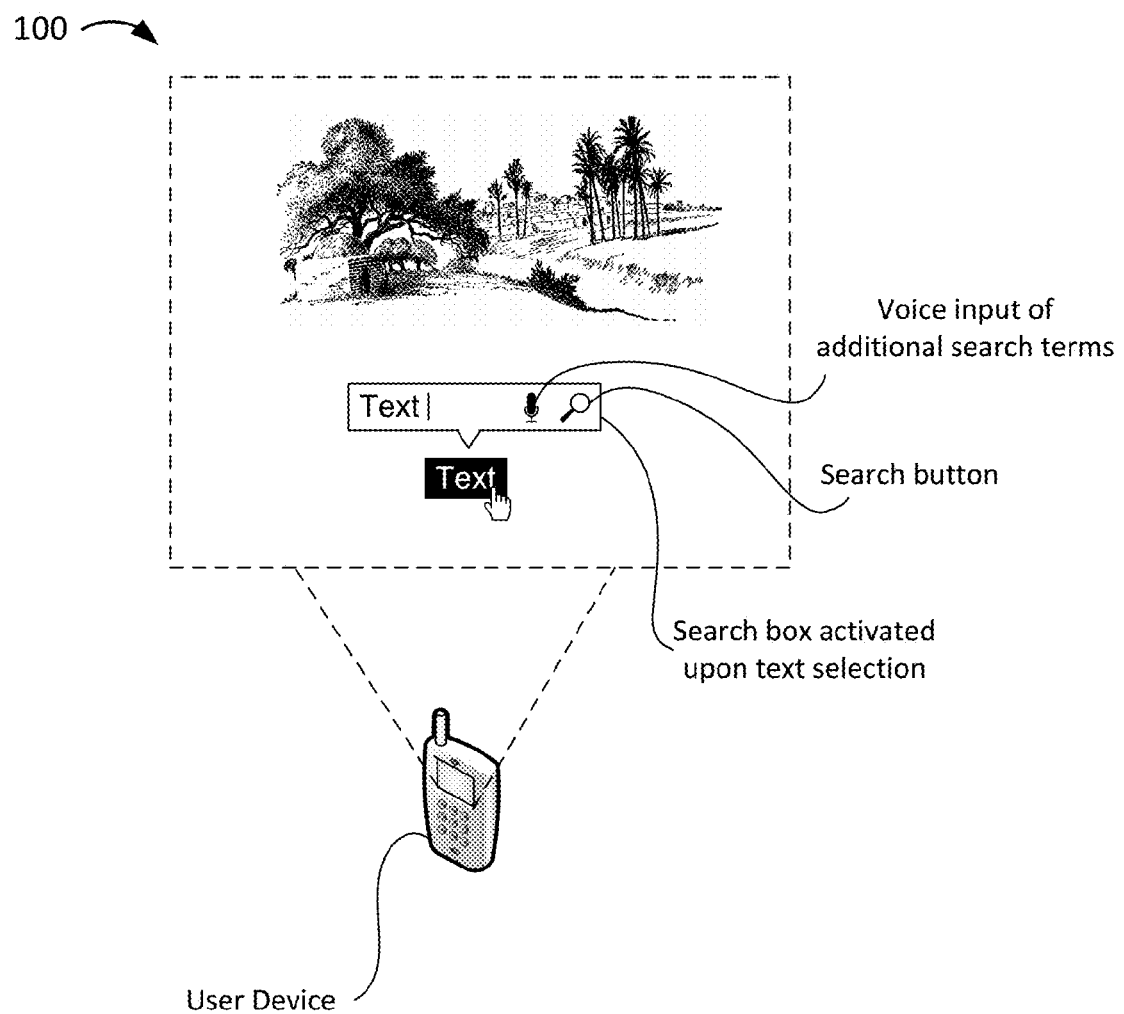
FIG. 1 illustrates an example overview of an implementation described herein.

FIG. 1 illustrates an example overview of an implementation described herein. As shown in FIG. 1, a user device (e.g., a smartphone, tablet, etc.) may display (e.g., in interface 100), text from within an application running on the user device. The user device may receive a selection of the text along with an instruction to display a search box. For example, a user of the user device may select the text and simultaneously provide the instruction to display the search box using a particular selection gesture (e.g., a "long-press" gesture in which the user physically touches the display of the user device, for a greater than a threshold amount of time, at a location that displays the text; a "triple-tap" gesture in which the usually physically taps the display of the user device, three or more times, at the location that displays the text, and/or some other type of gesture).

Based on receiving the selection of the text along with the instruction to display the search box (e.g., a search selection), the user device may display the search box and may pre-populate the search box with the selected text. As shown in FIG. 1, the search box may be a "pop-up" search box (e.g., a search box that is displayed from within an application or within a page, such as a webpage, from which the search selection is received). From the search box, the user may add terms to the search box (e.g., via voice input, keyboard input, etc.). Also from the search box, the user may provide a search query that includes the search terms inputted in to the search box. As shown in FIG. 1, the user device may display the search box from within the application and without causing the user device to navigate away from a current page or application from which the text was selected. The user may request that a search be performed via a search button in the search box. Based on receiving the selection to perform the search, the user device may communicate with an application server and/or some other server associated with a search engine to perform the search.

In some implementations, the user may continue to scroll through a page while keeping the search box open, so that the user may add terms of interest to the search box while reading through the page. As described in greater detail below, a primary user device may pair with an auxiliary user device, and the auxiliary user device may display the search results so that the original page and/or application may continue to be displayed on the primary user device.

Figure 2:
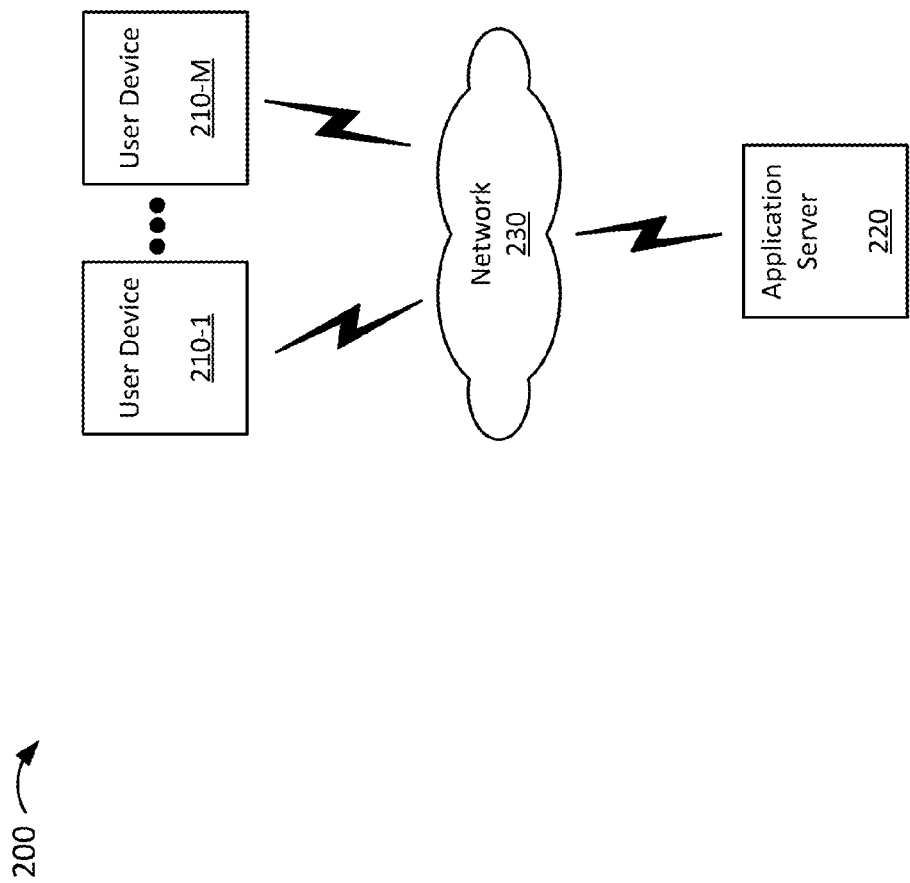
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M is an integer greater than or equal to 1), application server 220, and network 230.

User device 210 may include a device capable of communicating via a network, such as network 230. For example, user device 210 may correspond to a mobile communication device (e.g., a smart phone or a personal digital assistant (PDA)), a portable computer device (e.g., a laptop computer, a tablet computer, a wearable computer), a desktop computer device, a gaming device, and/or another type of device. In some implementations, user device 210 may display text content (e.g., articles, books, messages, etc.) within an application, and may receive, from a user of user device 210, a search selection from a user of user device 210. Based on receiving the search selection, user device 210 may present a search box. User device 210 may receive, from the user, an instruction to perform a search based on terms included in the search box. User device 210 may communicate with application server 220 in order to receive search results associated with the search.

In some implementations, user device 210 may be a primary user device 210 or an auxiliary user device 210. A primary user device 210 may pair with an auxiliary user device 210 (e.g., via short range personal area network (PAN), such as Bluetooth, Near-Field Communications (NFC), Wi-Fi, direct wired connection, etc.). The auxiliary user device 210 may display the search results so that the original page and/or application may continue to be displayed on the primary user device 210.

Application server 220 may include one or more computing devices, such as a server device or a collection of server devices. In some implementations, application server 220 may implement a search engine to receive a search query, perform a search, and prove search results to user device 210. Additionally, or alternatively, application server 220 may receive a search query, communicate with another device that implements a search engine, receive search results, and provide the search results to user device 210. In some implementations, environment 200 may include multiple application servers 220. Each application server 220 may implement a different search engine, and user device 210 may select a particular application server 220 with which to provide a search query based on the type of search engine selected by a user of user device 210.

Network 240 may include one or more wired and/or wireless networks. For example, network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 230 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
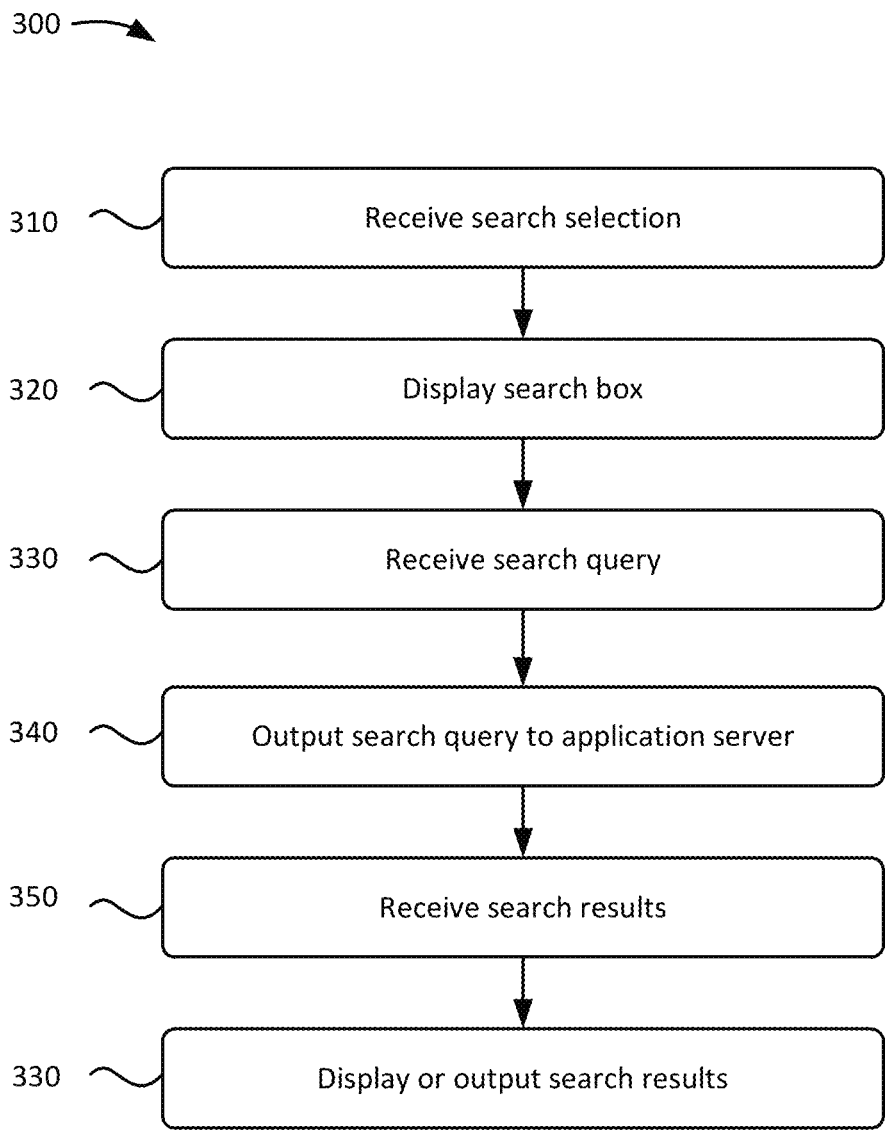
FIG. 3 illustrates a flowchart of an example process for displaying a search box and search results within an application in which a search selection is received.

FIG. 3 illustrates a flowchart of an example process 300 for displaying a search box and search results within an application in which a search selection is received. In some implementations, process 300 may be performed by user device 210. In some implementations, some or all of blocks of process 300 may be performed by one or more other devices.

As shown in FIG. 3, process 300 may include receiving a search selection (block 310). For example, user device 210 may receive a search selection from a user of user device 210. The search selection may include a selection of text within an application running on user device 210 and an instruction to display a search box from within the application (e.g., without navigating away from the application from a page within the application from which the text was selected). In some implementations, the search selection may not include a selection of text, but may only include an instruction to display the search box. In some implementations, user device 210 may receive the search selection based on detecting a search selection gesture (e.g., a "long-press" gesture in which the user physically touches the display of user device 210 for a greater than a threshold amount of time; a "triple-tap" gesture in which the usually physically taps the display of the user device three or more times, and/or some other type of gesture.) In some implementations, user device 210 may receive a search selection via some other technique. For example, user device 210 may receive a search selection via a physical or virtual button associated with user device 210. Additionally, or alternatively, user device 210 may receive a search selection via an auxiliary user device 210 (e.g., when the auxiliary user device 210 receives a search selection gesture, and/or some other input corresponding to the search selection).

In some implementations, user device 210 may receive the search selection via the application from which text is displayed (e.g., a web browser, an e-reader application, a messaging application, etc.). Additionally, or alternatively, user device 210 may receive the search selection from a search application running concurrently with the application from which the text is displayed. For example, the search application may monitor and/or receive data regarding user inputs and text currently being displayed. The search application may receive the search selection based on the user inputs corresponding to the search selection (e.g., the search selection gesture, a physical or virtual button press, etc.).

Process 300 may also include displaying a search box (block 320). For example, user device 210 may display a search box based on receiving the search selection. The search box may be a "pop-up" search box that is displayed within the same application and/or within the same page (e.g., webpage) in which the search selection was received. That is, user device 210 may display the search box without navigating to another application or another page than the application or page from which the search selection is received. User device 210 may pre-populate the search box with selected text (e.g., if the search selection included selected text). In some implementations, the search box may include input options to add search terms to the search box. For example, the search box may include a voice input option, a keyboard input option, and/or some other input option. In some implementations, the search box may include different search options. For example, the search box may include options for different search engines that may be used to perform a search. Additionally, or alternatively, the search box may include options for different domains that may be searched. Additionally, or alternatively, the search box may include an option to search within a currently displayed page. The different search options may be presented as icons within the search box.

Process 300 may further include receiving a search query (block 330). For example, user device 210 may receive the search query from the user via the search box (e.g., when the user requests a search to be performed by selecting a search icon or button presented in the search box). The search query may include search terms included in the search box. For example, the search query may include selected text and/or text inputted by the user after the search box was displayed. The search query may also identify search options, such as a particular search engine to use when performing the search, particular domains to search, and/or some other search option.

Process 300 may also include outputting the search query to an application server (block 340). For example, user device 210 may output the search query to application server 220. User device 210 may identify a particular application server 220 with to which to output the search query based on a selected search engine associated with the particular application server 220. In some implementations, user device 210 may output the search query to application server 220, and application server 220 may identify a particular device associated with the search engine, and output the search query to the particular device. In some implementations, application server 220 may perform the search in accordance with any other search options that may have been included in the search query. Application server 220 may then provide search results to user device 210.

Process 300 may further include receiving search results (block 350), and displaying or outputting the search results (block 360). For example, user device 210 may receive the search results from application server 220. User device 210 may display the search results within the application from which the search selection was received. In some implementations, user device 210 may output the search results to an auxiliary user device 210, and the auxiliary user device 210 may display the search results.

Figure 4:
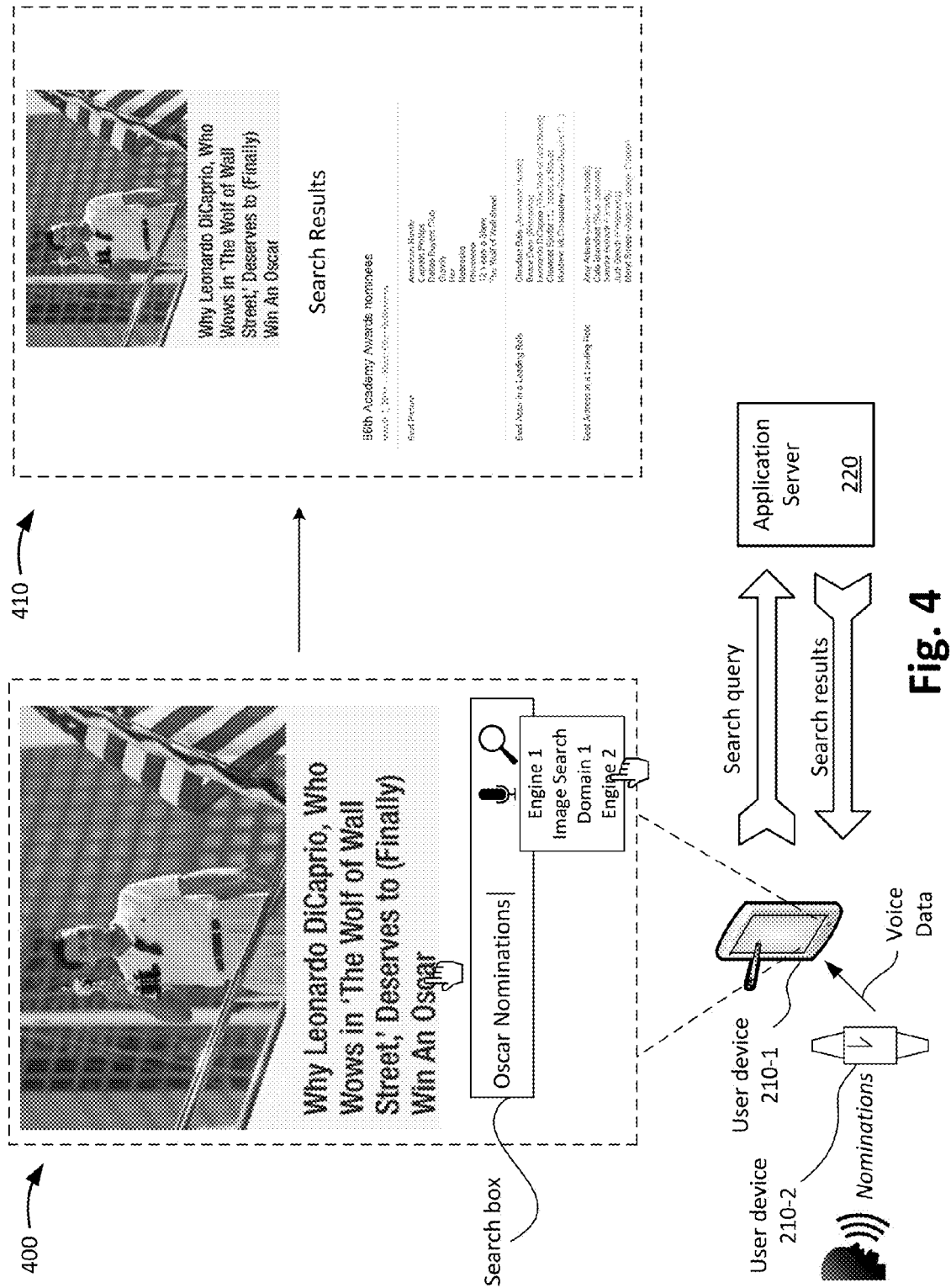
FIGS. 4-6 illustrate example implementations for displaying a search box within an application or within a page of an application in which a search selection is received.
Figure 5:
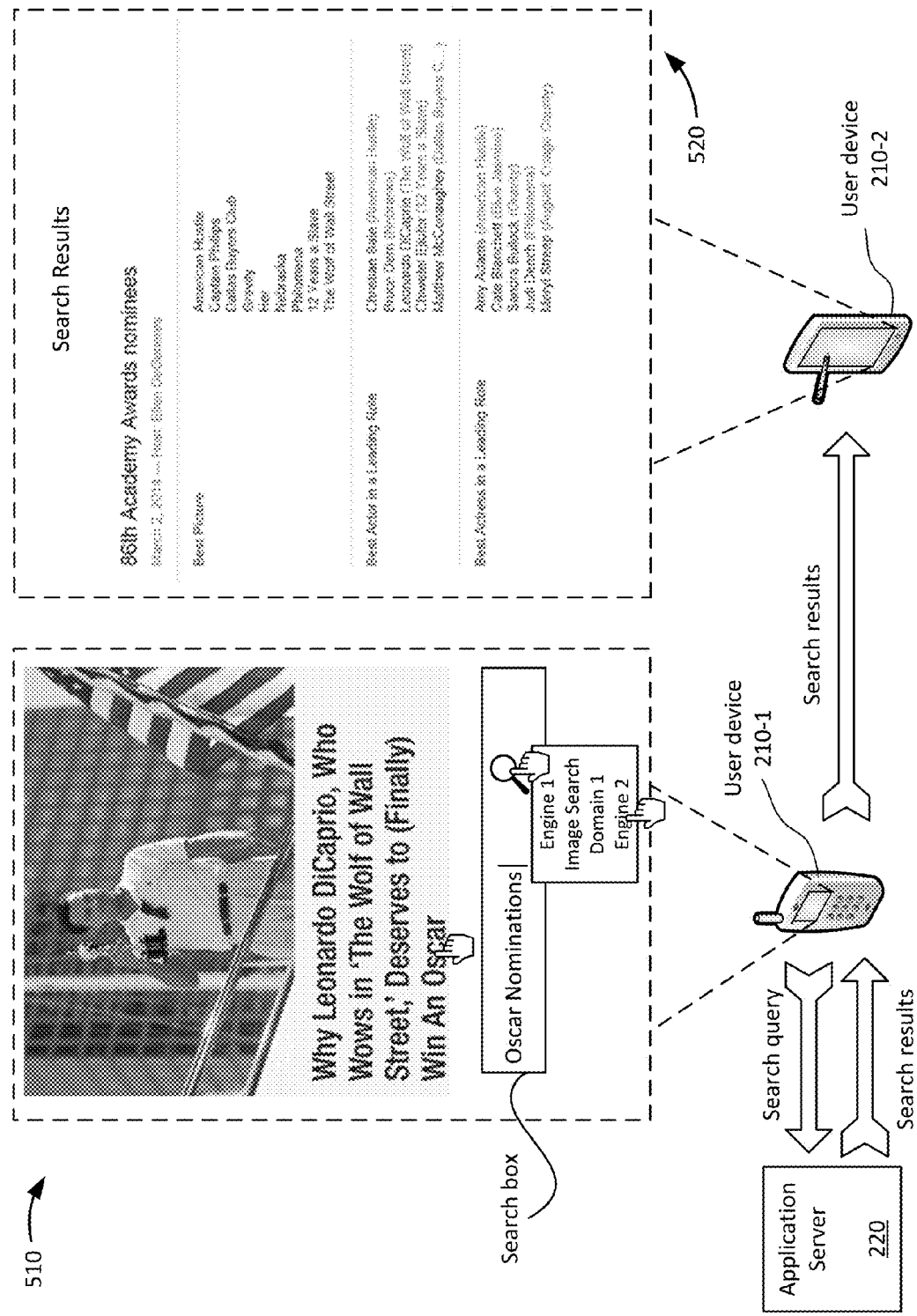
Figure 6:
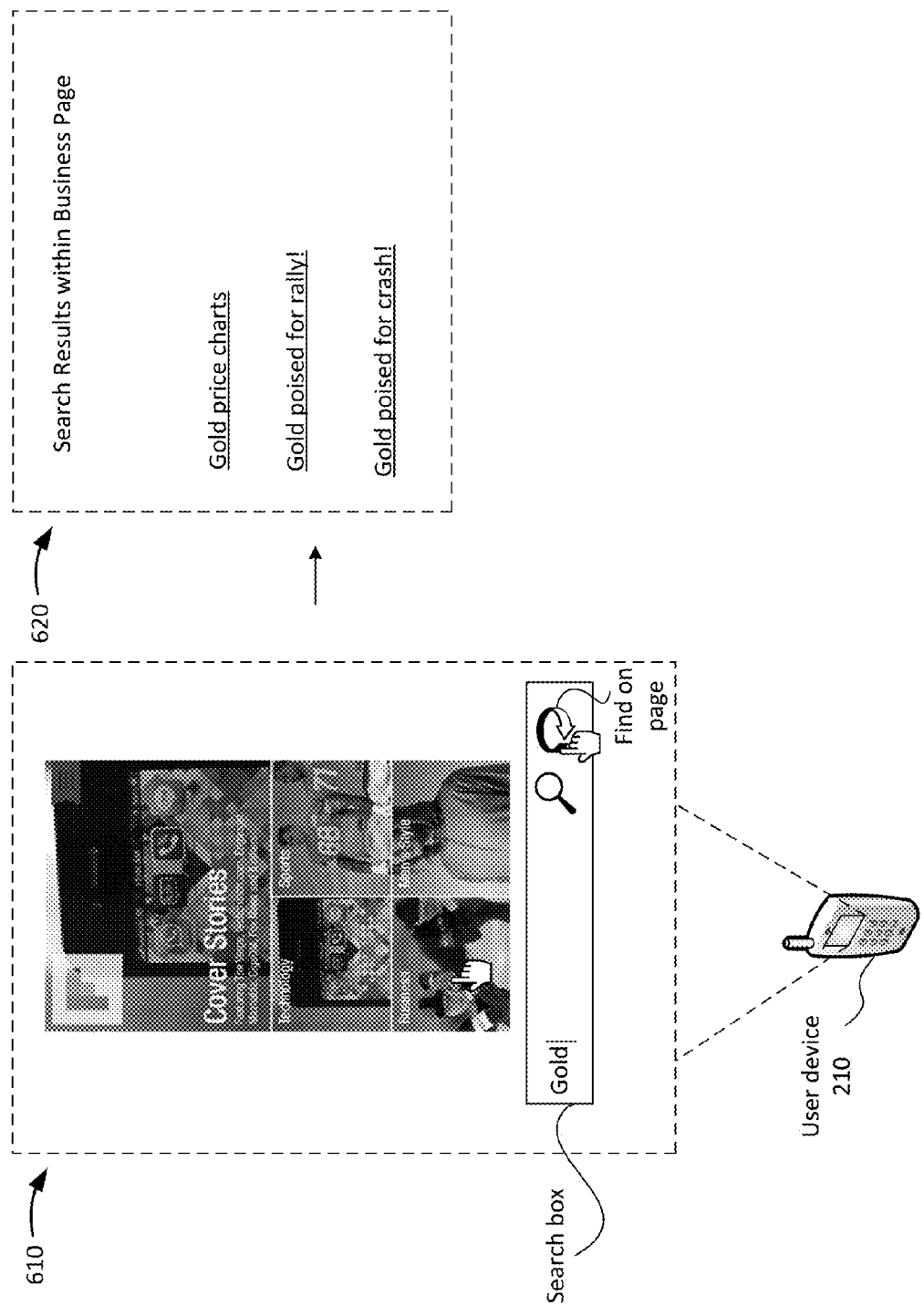

FIGS. 4-6 illustrate example implementations for displaying a search box within an application or within a page of an application in which a search selection is received. As shown in FIG. 4, a user of a primary user device (e.g., user device 210-1) may select text from an article presented within an application running on user device 210-1 (as shown in interface 400). When selecting the text, user device 210 may also receive a search selection. In response to receiving the search selection, user device 210-1 may present a search box and may pre-populate the search box with the selected text (e.g., with the word "Oscar"). User device 210-1 may also present an input option to add terms to the search box (e.g., a voice input option, as represented by a microphone icon). Since the search box is presented within the same application and page from which the search selection was received, the user may continue to view the article in order to identify additional search terms or items of interest that the user may be interested in searching. For example, while reading the article, the user may wish to search for a particular subject of interest (e.g., Oscar Nominations), and may input additional search terms via voice input (e.g., "Nominations").

In some implementations, user device 210-1 may receive the voice data via a microphone device associated with user device 210-1. Alternatively, and as shown in FIG. 4, an auxiliary user device 210, (e.g., user device 210-2, which may be, for example, a smart watch) may receive the voice data via a microphone device, determine a spoken word corresponding to the voice data, and provide information regarding the determined spoken word to user device 210-1. As shown in FIG. 4, user device 210-1 may receive information regarding the spoken word "Nominations," and may add the word "Nominations" to the search box.

As further shown in FIG. 4, the search box may include a search icon representing a search function (e.g., a magnifying glass icon). Based on receiving a selection of the search icon, user device 210-1 may present search options, such as an option to use a particular search engine, an option to perform an image search, an option to search a particular domain, and/or some other type of search option. Once the user has selected search options, user device 210 may receive a selection to perform the search based on the search query and the search options. User device 210-1 may then output the search query to application server 220, and application server 220 may perform the search in accordance with the selected search options. Application server 220 may provide search results to user device 210-1, and user device 210-1 may present the search results within the same application and/or page from which the search selection was received (e.g., as shown in interface 410). Alternatively, user device 210 may present the search results in a different page, tab, or application.

In some implementations, user device 210 may output the search results to another device (e.g., an auxiliary user device 210). For example, referring to FIG. 5, a primary user device 210 (e.g., user device 210-1), may receive a search selection, present a search box with selected text (e.g., the text "Oscar"), receive additional search terms, receive search options, and receive a selection to perform a search based on the search terms in the search box and the search options (as shown in interface 500). User device 210-1 may receive the search results from application server 220, and user device 210-1 may provide the search results to an auxiliary user device 210 (e.g., user device 210-2) for display (as shown in interface 510).

Referring to FIG. 6, user device 210 may present a search box after receiving a search selection from a user of user device 210 (e.g., as shown in interface 600). The search selection may correspond to a selection of a particular page (e.g., a page that includes articles relating to the field of business). User device 210 may receive a search term via the search box (e.g., the term "Gold"), and may receive an instruction to search for the search term within the selected page or may a select a topic based on the topic of the page (e.g. may focus on business articles from other pages). In some implementations, user device 210 may search for the term without involving application server 220 (e.g., once user device 210 receives the page from within which the search is to be performed). As shown in interface 610, user device 210 may present the search results after performing the search. In some implementations, user device 210 may provide a search query to application server 220 including the search terms "Business Gold" since the search selection corresponded to a selection for the page that includes articles relating to the field of business. This search query may provide more relevant results than had a search query for "Gold" been provided (e.g., since the search query for "Gold" may have yielded results that were not in the field of business).

While particular examples are shown in FIGS. 4-6, the above descriptions are merely example implementations. In practice, other examples are possible from what is described above in FIGS. 4-6.

Figure 7:
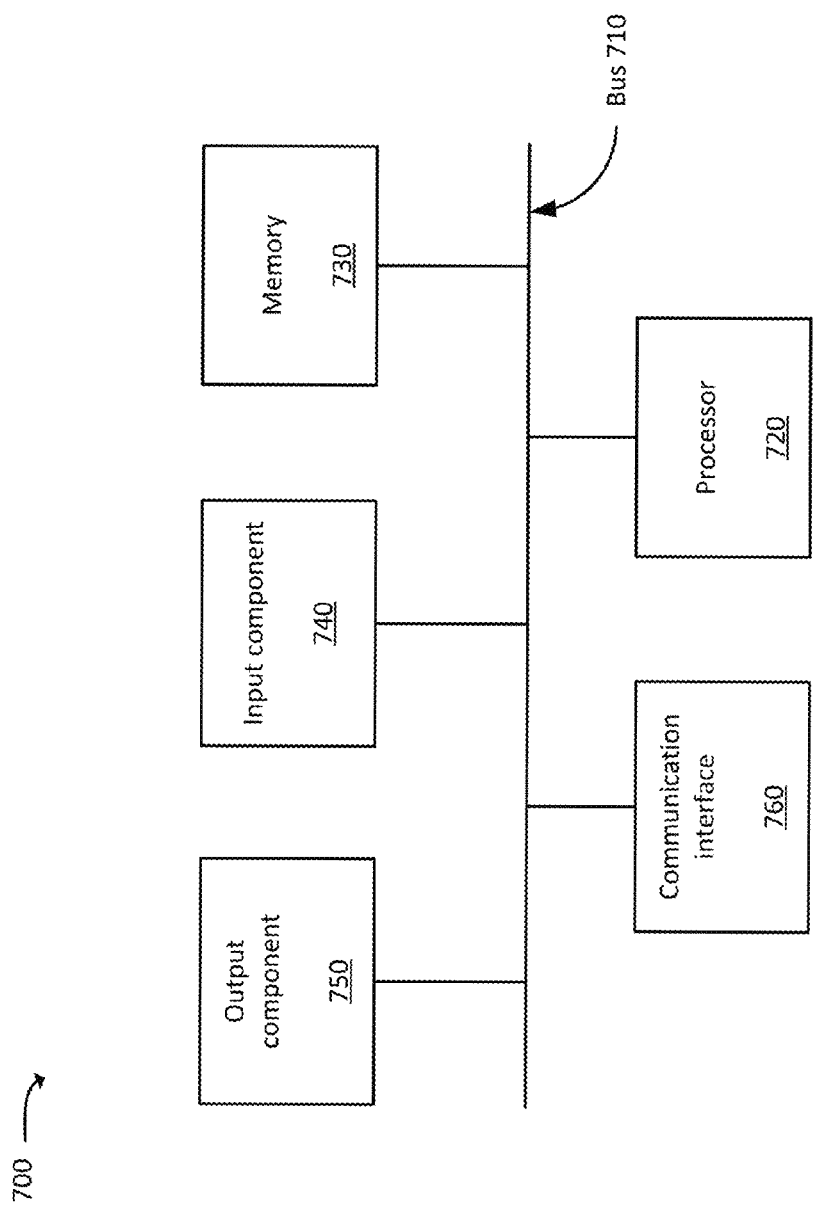
FIG. 7 illustrates example components of one or more devices, according to one or more implementations described herein.

FIG. 7 is a diagram of example components of device 700. One or more of the devices described above (e.g., with respect to FIGS. 1, 2, and 4-6) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device.

A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   displaying, by a user device, a page that includes content;
   receiving, by the user device, a selection of text presented on the page;
   displaying, by the user device and after receiving the selection of the text, a search box concurrently with the content of the page from which the selection was received,
      the search box being displayed without the user device navigating to another page, the search box being pre-populated with the selected text,
      the search box presenting a plurality of selectable options associated with a plurality of different search engines,
         wherein each selectable option, of the plurality of selectable options, is associated with a respective search engine, of the plurality of different search engines;
   receiving, by the user device and from a wearable second user device that is different from the user device, one or more additional terms, the one or more additional terms having been received by the wearable second user device via a microphone device associated with the wearable second user device;
   appending the one or more additional terms to the pre-populated text in the search box;
   receiving, by the user device, a selection of a particular selectable option associated with a particular search engine, of the plurality of different search engines;
   outputting, by the user device and to the selected search engine, a search query based on the text included in the search box, including the selected text and the one or more additional terms;
   receiving, by the user device, search results that were generated by the selected search engine based on the search query; and
   displaying, by the user device, the search results within the page from which the search selection was received, the displaying including appending the search results to the content of the page.

2. The method of claim 1, wherein displaying the search box includes displaying icons indicative of input options of the search terms.

3. The method of claim 1, wherein the user device is a first user device,
    wherein the method further includes outputting the search results to the second user device.

4. The method of claim 1, wherein receiving the selection includes detecting a search selection gesture, the search selection gesture including at least one of:
    continuous physical contact with a screen of the user device for a first threshold period of time, or
    physical contact made with the screen of the user device greater than a threshold quantity of times within a second threshold period of time.

5. The method of claim 1, wherein the search query includes search options, the search options including at least one of:
    a particular domain to search, or
    a particular page to search,
    wherein the search results include results in accordance with the search options.

6. The method of claim 1, wherein the wearable second user device includes a smart watch device.

7. The method of claim 1, wherein the search box includes an option to input additional search terms via keyboard input,
    the method further comprising receiving further additional search terms via the keyboard input,
    wherein outputting the search query further includes outputting the additional search terms received via the keyboard input.

8. A user device, comprising:
    a non-transitory memory device storing a plurality of processor-executable instructions; and
    a processor configured to execute the processor-executable instructions, wherein executing the processor-executable instructions causes the processor to:
        receive a selection of text presented on a page;
        after receiving the selection of text, display a search box concurrently with a page from which the search selection was received,
            the search box being displayed without the user device navigating to another page, the search box being pre-populated with the selected text,
            the search box presenting a plurality of selectable options associated with a plurality of different search engines,
                wherein each selectable option, of the plurality of selectable options, is associated with a respective search engine, of the plurality of different search engines;
        receive, from a wearable second user device that is different from the user device, one or more additional terms, the one or more additional terms having been received by the wearable second user device via a microphone device associated with the wearable second user device;
        append the one or more additional terms to the pre-populated text in the search box;
        receive a selection of a particular selectable option associated with a particular search engine;
        output, to the selected search engine, a search query based on the text included in the search box, including the selected text and the one or more additional terms;
        receive search results that were generated by the selected search engine based on the search query; and
        display the search results within the page from which the search selection was received, by appending the search results to the page.

9. The user device of claim 8, wherein executing the processor-executable instructions, to display the search box causes the processor to display icons indicative of input options of the search terms.

10. The user device of claim 8, wherein the user device is a first user device,
    wherein executing the processor-executable instructions further causes the processor to output the search results to the second user device that is different than the first user device.

11. The user device of claim 8, wherein executing the processor-executable instructions, to receive the search selection, causes the processor to detect a search selection gesture, the search selection gesture including at least one of:
    continuous physical contact with a screen of the user device for a first threshold period of time, or
    physical contact made with the screen of the user device greater than a threshold quantity of times within a second threshold period of time.

12. The user device of claim 8, wherein the search query includes search options, the search options including at least one of:
    a particular domain to search, or
    a particular page to search,
    wherein executing the processor-executable instructions, to receive the results to the search query causes the processor to receive the search results in accordance with the search options.

13. The user device of claim 8, wherein the wearable second user device includes a smart watch device.

14. A non-transitory computer-readable medium storing instructions a plurality of instructions which, when executed by one or more processors associated with a user device, cause the one or more processors to:
    present a page that includes text;
    receive a selection of particular text included in the page;
    after receiving the selection of the particular text, display a search box concurrently with the page from which the selection was received,
        the search box being displayed without the user device navigating to another page,
        the search box being pre-populated with the particular text upon display of the search box, and further being editable by a user of the user device,
        the search box presenting a plurality of selectable options associated with a plurality of different search engines,
            wherein each selectable option, of the plurality of selectable options, is associated with a respective search engine, of the plurality of different search engines;
    receive, from a wearable second user device that is different from the user device, one or more additional terms, the one or more additional terms having been received by the wearable second user device via a microphone device associated with the wearable second user device;
    append the one or more additional terms to the pre-populated text in the search box;

output a search query based on search terms inputted into the search box and further based on the selected search engine, the search terms including:
the pre-populated particular text, and
the one or more additional terms;
receive search results to the search query, the search results having been identified by the selected search engine; and
display the search results within the page from which the selection was received, by appending the search results to the page, without navigating away from the page.

15. The non-transitory computer-readable medium of claim 14, wherein the user device is a first user device,
wherein the plurality of instructions further cause the one or more processors to output the search results to the second user device.

16. The non-transitory computer-readable medium of claim 14, wherein one or more instructions, of the plurality of instructions, to receive the search selection, cause the one or more processors to:
detect a search selection gesture, the search selection gesture including at least one of:
continuous physical contact with a screen of the user device for a first threshold period of time, or
physical contact made with the screen of the user device greater than a threshold quantity of times within a second threshold period of time.

17. The non-transitory computer-readable medium of claim 14, wherein the one or more additional terms have been identified using speech recognition.

18. The non-transitory computer-readable medium of claim 14, wherein one or more instructions, of the plurality of instructions, to display the search box, cause the one or more processors to:
display icons indicative of input options of the search terms.

19. The non-transitory computer-readable medium of claim 14, wherein the search query includes search options, the search options including at least one of:
a particular domain to search, or
a particular page to search,
wherein the search results include results in accordance with the search options.

20. The non-transitory computer-readable medium of claim 14, wherein the wearable second user device includes a smart watch device.

* * * * *